United States Patent
Villeneuve et al.

(10) Patent No.: US 10,544,732 B2
(45) Date of Patent: Jan. 28, 2020

(54) ROTARY INTERNAL COMBUSTION ENGINE WITH REMOVABLE SUBCHAMBER INSERT

(71) Applicant: Pratt & Whitney Canada Corp., Longueuil (CA)

(72) Inventors: Bruno Villeneuve, Boucherville (CA); Edwin Schulz, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 15/153,277

(22) Filed: May 12, 2016

(65) Prior Publication Data

US 2016/0252010 A1 Sep. 1, 2016

Related U.S. Application Data

(63) Continuation-in-part of application No. 13/750,523, filed on Jan. 25, 2013, now Pat. No. 9,528,434, which (Continued)

(51) Int. Cl.
*F02B 53/10* (2006.01)
*F02B 55/16* (2006.01)
*F02B 53/04* (2006.01)

(52) U.S. Cl.
CPC .............. *F02B 53/04* (2013.01); *F02B 53/10* (2013.01); *F02B 55/16* (2013.01)

(58) Field of Classification Search
CPC .......... F01C 1/22; F01C 21/18; F01C 21/106; F01C 21/183; F01C 21/06; F01C 21/08;

(Continued)

(56) References Cited

U.S. PATENT DOCUMENTS

| 1,539,133 A | 5/1925 | Markle et al. |
| 1,662,901 A * | 3/1928 | Ripley .................... B61F 15/02 |
| | | 116/208 |

(Continued)

FOREIGN PATENT DOCUMENTS

| CN | 102691564 | 9/2012 |
| DE | 1926474 | 1/1970 |

(Continued)

OTHER PUBLICATIONS

Internet Archive. Website crawl record [online]. Internet Archive Wayback Machine [retrieved on Aug. 5, 2017]. Retrieved from the Internet: <URL: https://web.archive.org/web/20130722101922/http://mgaguru.com/mgtech/engine/cs111a.htm>.*

(Continued)

*Primary Examiner* — J. Todd Newton
(74) *Attorney, Agent, or Firm* — Norton Rose Fulbright Canada LLP

(57) ABSTRACT

A rotary engine having an outer body having an internal cavity with a peripheral wall having an insert opening defined therethrough in communication with the internal cavity, and a plurality of coolant passages defined through the peripheral wall in proximity of the insert opening, a rotor body rotatable within the internal cavity, and an insert removably received in the insert opening of the peripheral wall, the insert having a subchamber defined therein communicating with the internal cavity, with a minimum width of the insert opening being at least 0.75 inches. An outer body for a rotary engine and a method of inspecting in an internal cavity in an outer body of a rotary engine are also discussed; also, a rotary engine including a fuel injector having a tip received in the injector hole of the peripheral wall without protruding in the insert opening.

11 Claims, 12 Drawing Sheets

Related U.S. Application Data is a continuation-in-part of application No. 13/273,534, filed on Oct. 14, 2011, now Pat. No. 9,038,594.

(60) Provisional application No. 61/512,593, filed on Jul. 28, 2011.

(58) Field of Classification Search
CPC .......... F01C 20/24; F01C 20/10; F01C 20/06; F01C 11/006; F04C 29/0092; F04C 2240/80
See application file for complete search history.

(56) References Cited

U.S. PATENT DOCUMENTS

| | | | | |
|---|---|---|---|---|
| 2,093,339 | A * | 9/1937 | Pippig | F02M 69/00 123/258 |
| 2,102,784 | A * | 12/1937 | Bridges | B60C 11/24 116/201 |
| 2,310,639 | A * | 2/1943 | Johnson, Jr. | B25B 27/062 29/262 |
| 2,488,933 | A * | 11/1949 | Randolph | B25B 23/103 81/113 |
| 2,739,578 | A | 3/1956 | Stump | |
| 2,782,883 | A * | 2/1957 | Rosan | F16B 39/10 52/705 |
| 2,932,289 | A * | 4/1960 | Witzky | F02B 19/14 123/273 |
| 2,935,054 | A | 5/1960 | Franke et al. | |
| 3,044,454 | A | 7/1962 | Sutton | |
| 3,056,380 | A * | 10/1962 | White | F16D 66/02 156/64 |
| 3,058,452 | A | 10/1962 | Espenschied | |
| 3,102,521 | A * | 9/1963 | Slemmons | F02M 69/00 123/263 |
| 3,126,876 | A * | 3/1964 | Kimberley | F02B 53/10 123/206 |
| 3,359,956 | A * | 12/1967 | Bentele | F02B 55/02 123/205 |
| 3,391,677 | A | 7/1968 | Héjj | |
| 3,508,530 | A | 4/1970 | Clawson | |
| 3,512,907 | A * | 5/1970 | Belzner | F02B 53/12 123/210 |
| 3,533,491 | A * | 10/1970 | Svenson | F16D 66/02 116/208 |
| 3,628,899 | A * | 12/1971 | George | F02B 53/00 418/61.2 |
| 3,722,480 | A * | 3/1973 | Berkowitz | F02B 53/12 123/210 |
| 3,736,080 | A | 5/1973 | Sabet | |
| 3,756,754 | A * | 9/1973 | Sakamaki | F01C 19/005 277/357 |
| 3,762,842 | A * | 10/1973 | George, Jr. | F02B 53/00 418/61.2 |
| 3,779,215 | A | 12/1973 | Sabet | |
| 3,842,792 | A * | 10/1974 | Souther | G01N 3/56 116/208 |
| 3,857,369 | A * | 12/1974 | Sabet | F02B 53/10 123/209 |
| 3,861,361 | A | 1/1975 | Klomp et al. | |
| 3,894,518 | A | 7/1975 | Gavrun et al. | |
| 3,910,238 | A | 10/1975 | James | |
| 3,941,097 | A * | 3/1976 | Seufer | F02B 53/12 123/169 PA |
| 3,952,708 | A * | 4/1976 | Burley | F02B 53/12 123/211 |
| 3,954,088 | A * | 5/1976 | Scott | F02B 55/14 123/209 |
| 3,957,021 | A | 5/1976 | Loyd | |
| 3,976,036 | A | 8/1976 | Muroki et al. | |
| 3,987,759 | A | 10/1976 | Roberts et al. | |
| 4,009,688 | A | 3/1977 | Hayashida et al. | |
| 4,029,058 | A | 6/1977 | Jones | |
| 4,057,036 | A | 11/1977 | Gibson | |
| 4,060,058 | A | 11/1977 | Hideg et al. | |
| 4,066,044 | A | 1/1978 | Jones et al. | |
| 4,074,956 | A | 2/1978 | Maruyama et al. | |
| 4,077,366 | A | 3/1978 | Hideg et al. | |
| 4,080,934 | A | 3/1978 | Jones | |
| 4,083,329 | A | 4/1978 | Myers | |
| 4,085,712 | A | 4/1978 | Myers et al. | |
| 4,089,306 | A * | 5/1978 | Goloff | F02B 19/00 123/209 |
| 4,091,789 | A * | 5/1978 | Jones | F02B 17/005 123/205 |
| 4,095,564 | A * | 6/1978 | Hochstein | F02B 53/12 123/211 |
| 4,096,828 | A | 6/1978 | Satou et al. | |
| 4,108,136 | A | 8/1978 | Hideg et al. | |
| 4,186,692 | A | 2/1980 | Kawamura et al. | |
| 4,239,023 | A * | 12/1980 | Simko | F02B 19/1085 123/275 |
| 4,259,932 | A | 4/1981 | Hideg et al. | |
| 4,322,966 | A * | 4/1982 | Golabek | G06M 1/00 116/208 |
| 4,323,039 | A | 4/1982 | Tsungekawa et al. | |
| 4,483,290 | A | 11/1984 | Hass | |
| 4,577,600 | A | 3/1986 | Morita et al. | |
| 4,616,611 | A | 10/1986 | Ogawa et al. | |
| 4,651,692 | A | 3/1987 | Morita et al. | |
| 4,662,331 | A | 5/1987 | Ogawa et al. | |
| 4,672,933 | A | 6/1987 | Taniguchi et al. | |
| 4,676,207 | A | 6/1987 | Kawamura et al. | |
| 4,681,074 | A | 7/1987 | Ogawa et al. | |
| 4,685,286 | A * | 8/1987 | Hetzer | F02C 7/20 60/772 |
| 4,699,102 | A | 10/1987 | Taniguchi | |
| 4,714,062 | A | 12/1987 | Toeda | |
| 4,759,325 | A | 7/1988 | Jones | |
| 4,814,664 | A * | 3/1989 | Rothenbuhler | H01T 13/20 116/208 |
| 4,873,952 | A | 10/1989 | Narita et al. | |
| 4,875,444 | A | 10/1989 | Tsuchida et al. | |
| 4,884,538 | A | 12/1989 | Tanaka | |
| 4,886,009 | A * | 12/1989 | Gondar | B23D 51/025 116/208 |
| 4,899,707 | A | 2/1990 | Matsuura | |
| 4,926,817 | A | 5/1990 | Imoto et al. | |
| 4,962,736 | A | 10/1990 | Matsuo et al. | |
| 5,014,662 | A | 5/1991 | Trapy | |
| 5,022,366 | A | 6/1991 | Abraham et al. | |
| 5,024,193 | A | 6/1991 | Graze | |
| 5,065,714 | A | 11/1991 | Matsuoka | |
| 5,109,817 | A | 5/1992 | Cherry | |
| 5,168,846 | A | 12/1992 | Paul | |
| 5,178,104 | A | 1/1993 | Ito et al. | |
| 5,335,061 | A | 8/1994 | Yamamoto et al. | |
| 5,451,110 | A * | 9/1995 | Gams, Jr. | B02C 2/06 116/208 |
| 5,520,864 | A | 5/1996 | Frei | |
| 5,522,356 | A | 6/1996 | Palmer | |
| 5,524,587 | A | 6/1996 | Mallen et al. | |
| 5,540,056 | A | 7/1996 | Heberling et al. | |
| 5,579,717 | A * | 12/1996 | Crandell | B24B 37/048 116/208 |
| 5,678,524 | A | 10/1997 | Ofner et al. | |
| 5,709,189 | A | 1/1998 | Monnier | |
| 5,720,251 | A * | 2/1998 | Round | F01C 1/06 123/209 |
| 5,979,395 | A | 11/1999 | Mallen et al. | |
| 6,062,188 | A | 5/2000 | Okamura | |
| 6,125,813 | A * | 10/2000 | Louthan | F01C 1/22 123/209 |
| 6,162,034 | A | 12/2000 | Mallen | |
| 6,244,240 | B1 | 6/2001 | Mallen | |
| 6,321,713 | B1 | 11/2001 | Mallen | |
| 6,415,735 | B1 * | 7/2002 | Rogers | F16D 3/185 116/208 |
| 6,435,851 | B2 | 8/2002 | Mallen | |
| 6,694,944 | B2 | 2/2004 | Agama et al. | |
| 6,860,251 | B1 | 3/2005 | Reed | |

(56) References Cited

U.S. PATENT DOCUMENTS

| | | | |
|---|---|---|---|
| 6,892,692 B2 | 5/2005 | Barrett | |
| 7,370,626 B2 | 5/2008 | Schubert | |
| 7,424,936 B2* | 9/2008 | McClellan | F16D 66/028 |
| | | | 188/1.11 R |
| 7,753,036 B2 | 7/2010 | Lents et al. | |
| 7,775,044 B2 | 8/2010 | Julien et al. | |
| 7,832,372 B2 | 11/2010 | Blank | |
| 7,950,364 B2 | 5/2011 | Nerheim | |
| 8,033,264 B2 | 10/2011 | Lauther | |
| 8,403,012 B2* | 3/2013 | Harvey | B60C 11/24 |
| | | | 152/154.2 |
| 9,038,594 B2 | 5/2015 | Thomassin et al. | |
| 9,057,321 B2 | 6/2015 | Reitz et al. | |
| 9,121,277 B2 | 9/2015 | Gekht et al. | |
| 9,200,563 B2 | 12/2015 | Thomassin | |
| 9,217,360 B2 | 12/2015 | Pierz | |
| 9,334,794 B2 | 5/2016 | Gaul et al. | |
| 9,353,680 B2 | 5/2016 | Villeneuve et al. | |
| 9,355,346 B2* | 5/2016 | Butz | B60C 11/24 |
| 9,399,947 B2 | 7/2016 | Schulz et al. | |
| 9,528,434 B1 | 12/2016 | Thomassin et al. | |
| 9,556,743 B2* | 1/2017 | Chamberlain | C04B 41/85 |
| 9,638,093 B2 | 5/2017 | Blank | |
| 9,664,047 B2 | 5/2017 | McDaniel et al. | |
| 9,885,241 B2* | 2/2018 | Bakker | B25B 23/16 |
| 10,060,099 B2* | 8/2018 | Serrurier | G06F 17/50 |
| 2009/0255384 A1* | 10/2009 | Whitehead | B25B 27/0035 |
| | | | 81/459 |
| 2009/0309475 A1 | 12/2009 | Tozzi | |
| 2012/0227397 A1 | 9/2012 | Willi et al. | |
| 2012/0285226 A1* | 11/2012 | Laurer | F01D 5/12 |
| | | | 73/86 |
| 2013/0160734 A1 | 6/2013 | Redtenbacher et al. | |
| 2013/0321612 A1* | 12/2013 | Bousquet | G01N 21/91 |
| | | | 348/82 |
| 2014/0251258 A1 | 9/2014 | Thomassin et al. | |
| 2014/0261293 A1 | 9/2014 | Schulz et al. | |
| 2015/0260087 A1* | 9/2015 | Wang | F02B 53/02 |
| | | | 123/200 |
| 2015/0275749 A1 | 10/2015 | Thomassin | |
| 2015/0275756 A1 | 10/2015 | Bolduc et al. | |
| 2015/0337663 A1* | 11/2015 | Bakker | B25B 23/16 |
| | | | 416/144 |
| 2016/0053667 A1 | 2/2016 | Loetz et al. | |
| 2017/0159446 A1* | 6/2017 | Graham | F01D 5/147 |
| 2018/0045066 A1* | 2/2018 | Chuong | F01D 11/025 |

FOREIGN PATENT DOCUMENTS

| | | |
|---|---|---|
| DE | 10121036 | 11/2002 |
| DE | 102011083143 | 3/2013 |
| EP | 2497902 | 9/2012 |
| EP | 2551448 | 1/2013 |
| GB | 1193878 | 6/1970 |
| JP | 49-12220 | 2/1974 |
| JP | 58-162721 | 9/1983 |
| JP | 59-007726 | 1/1984 |
| JP | 59-046317 | 3/1984 |
| JP | 59017252 | 4/1984 |
| JP | 6093124 | 5/1985 |
| JP | 61-083451 | 4/1986 |
| JP | 61-093227 | 5/1986 |
| JP | 61-123714 | 6/1986 |
| JP | 62-010418 | 1/1987 |
| JP | 628345 | 2/1987 |
| JP | 63179134 | 7/1988 |
| JP | 63179136 | 7/1988 |
| JP | S63159614 | 7/1988 |
| JP | S6480722 | 3/1989 |
| JP | 01-151722 | 6/1989 |
| JP | 3003940 | 1/1991 |
| JP | 3199627 | 8/1991 |
| JP | 04-140418 | 5/1992 |
| JP | 4-298641 | 10/1992 |
| JP | 6221176 | 8/1994 |
| JP | 3210027 | 7/2001 |
| JP | 3233138 | 9/2001 |
| JP | 4031630 | 10/2007 |
| JP | 2011-122598 | 6/2011 |
| RU | 2387851 | 12/2009 |
| SK | 6949 | 6/2014 |
| WO | 9857037 | 12/1998 |
| WO | 2008043154 | 4/2008 |
| WO | 2011092365 | 8/2011 |

OTHER PUBLICATIONS

ASME, ASME Y14.6, Screw Thread Representation, 2007, ASME, p. 4, fig. 2 (Year: 2007).*

Metu, Assembly Elements: Threaded Fasteners, 2003, Figure 6, Retrieved from the internet on Jun. 14, 2019. Retrieved from the internet: . (Year: 2003).*

NASA Contractor Report 189106, vol. 1, Stratified Charge Rotary Engine Critical Technology Enablement, vol. 1, 1992, pp. 1 to 94, C.E. Iron and R.E. Mount, Wood-Ridge, New Jersey.

Rotary Engine by Kenichi Yamamoto, 1981.

* cited by examiner

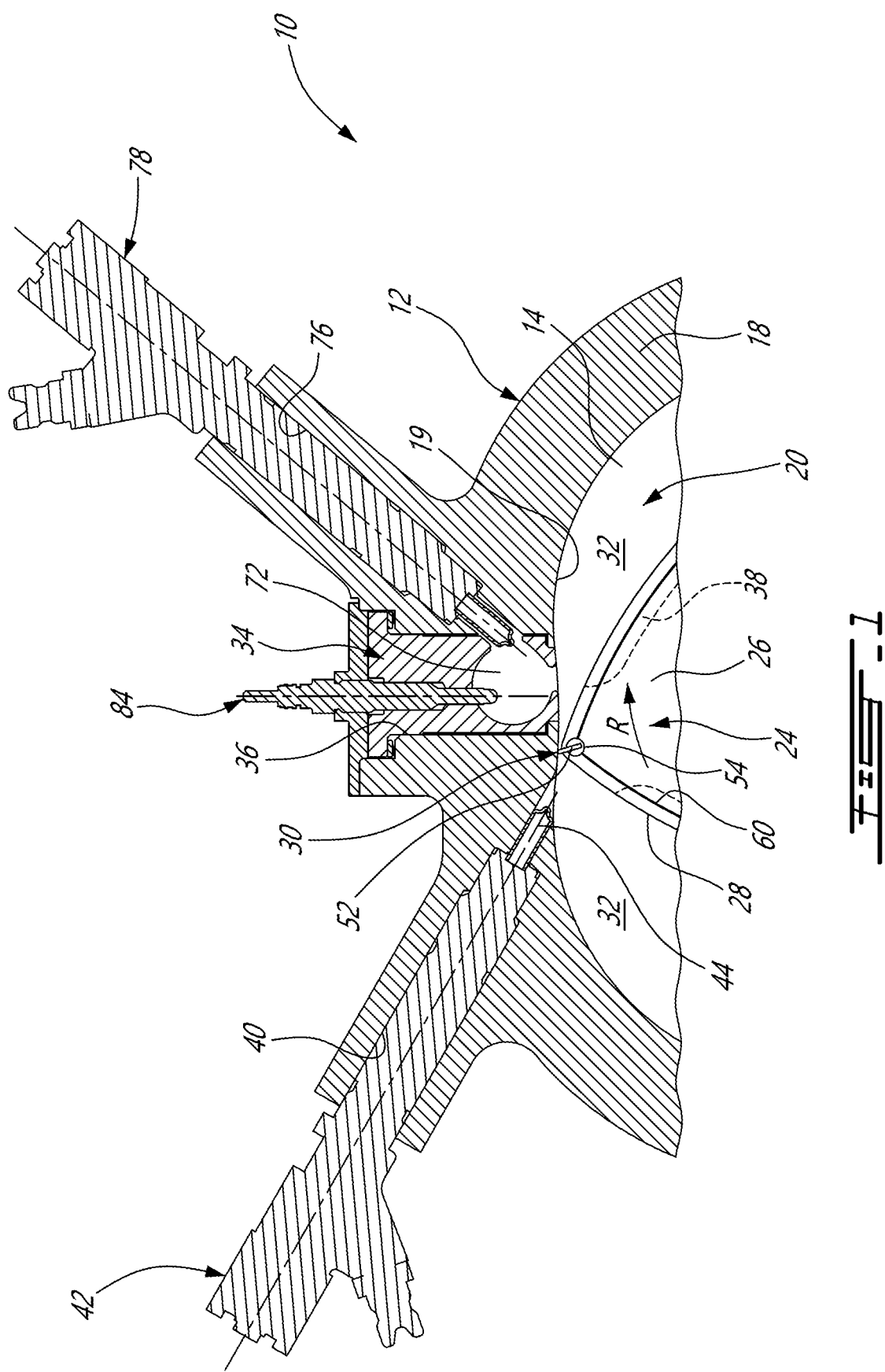

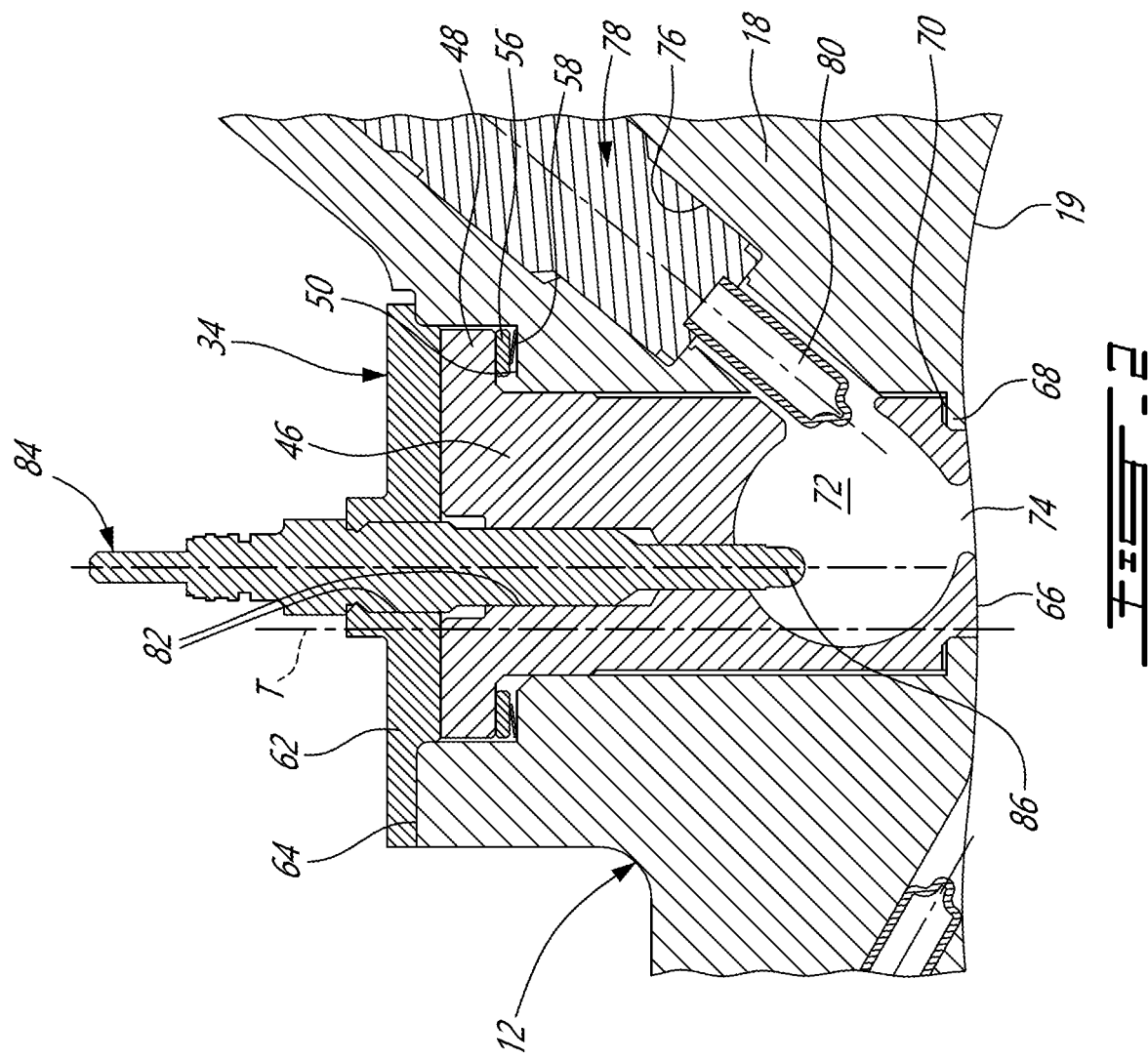

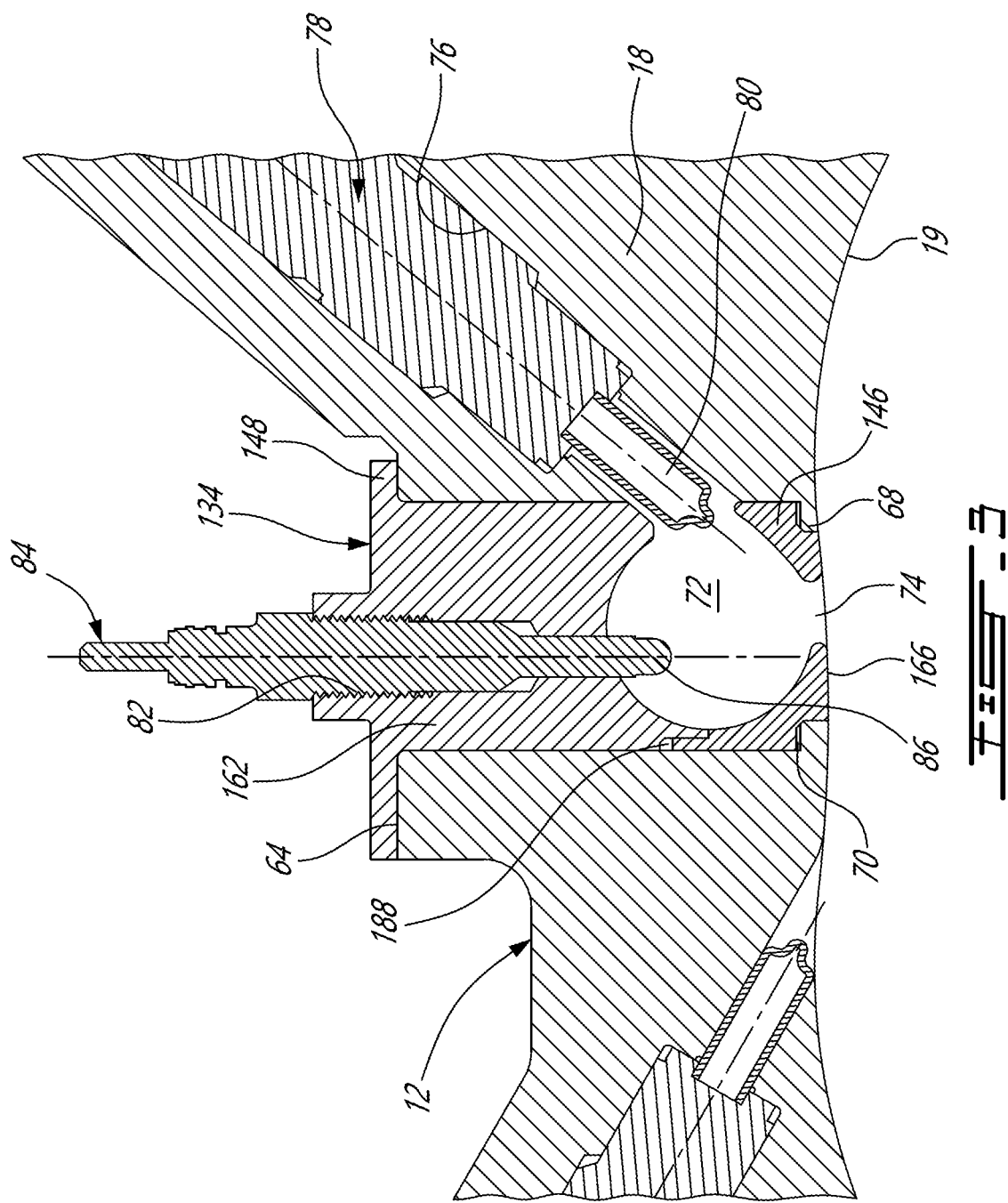

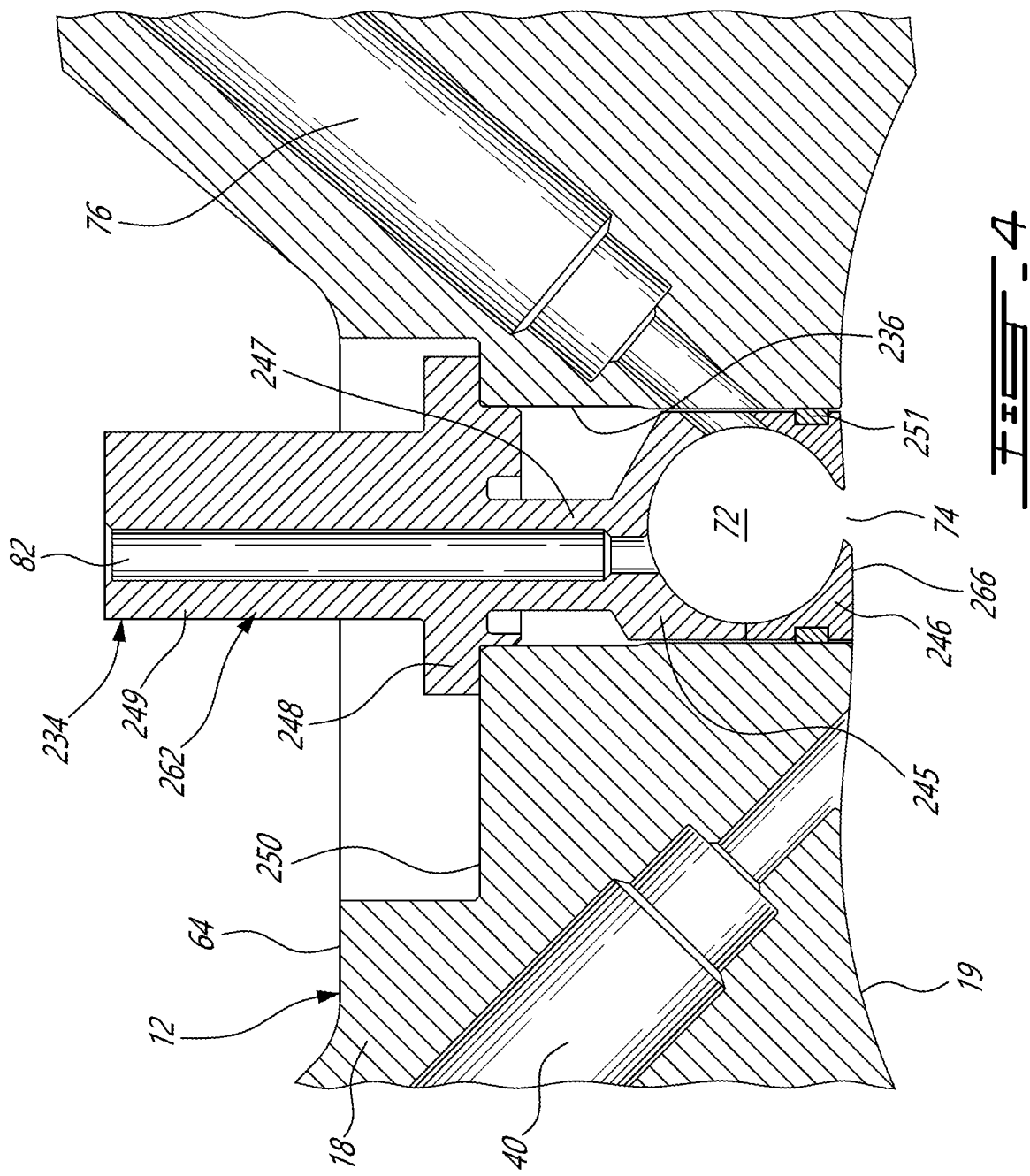

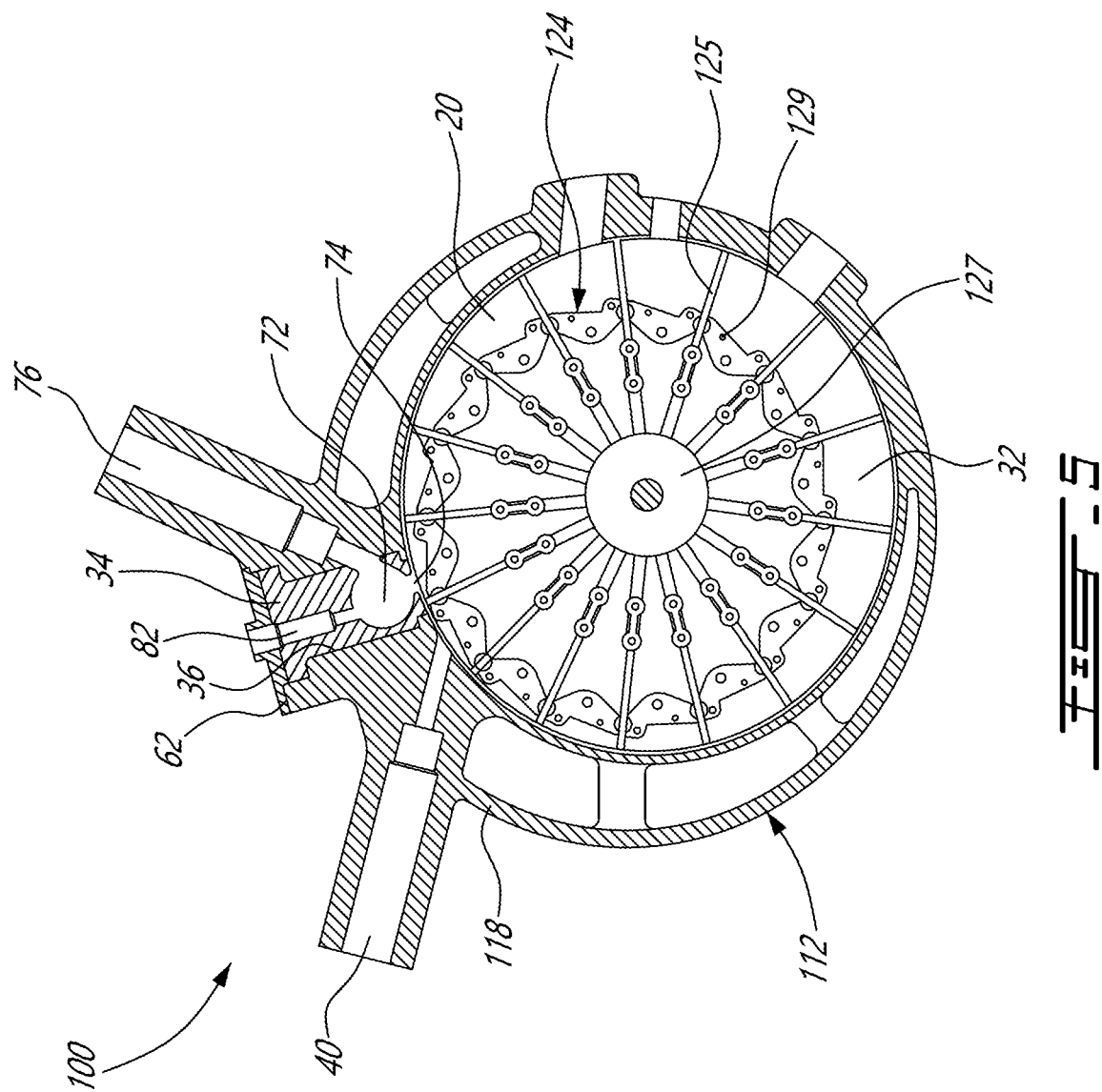

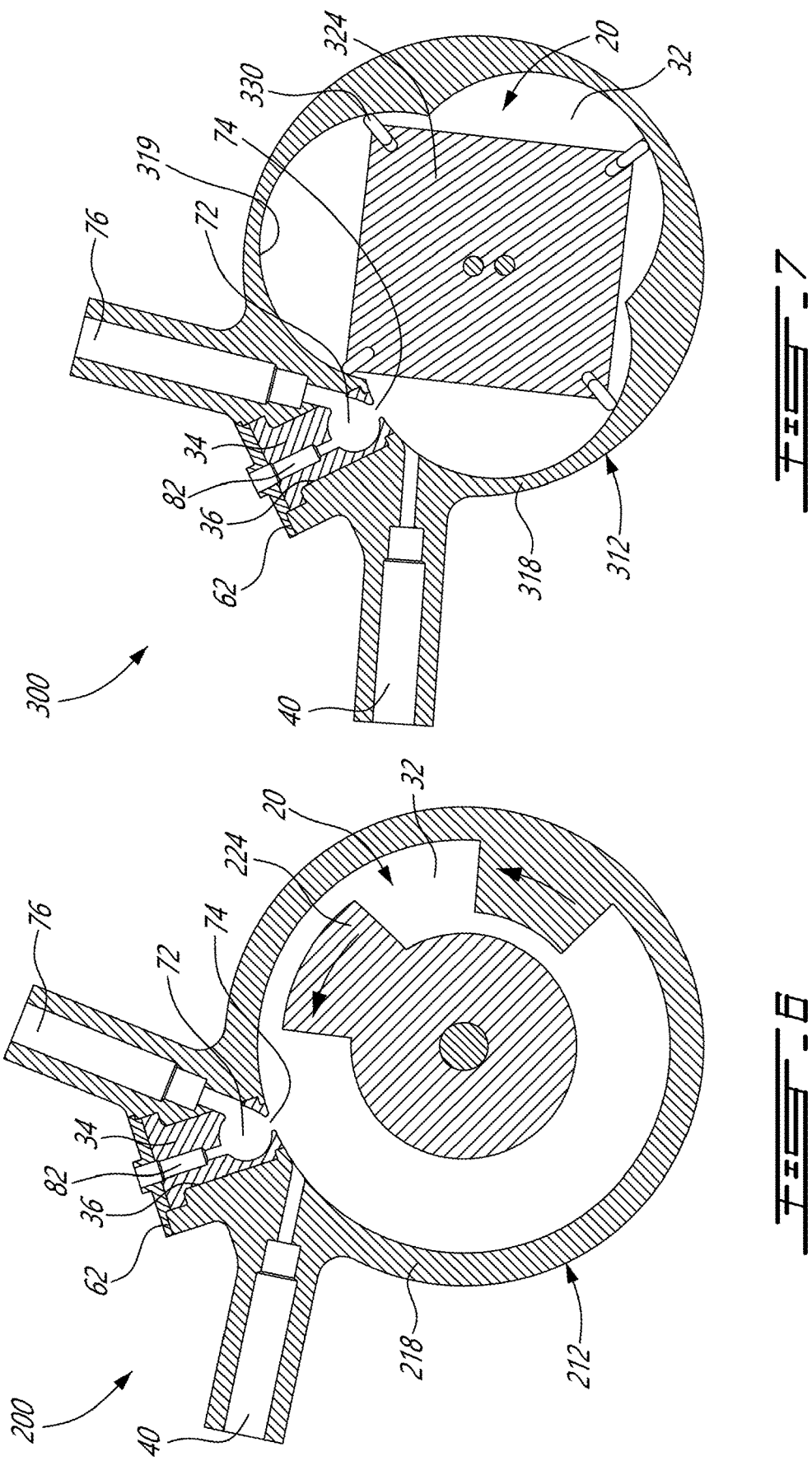

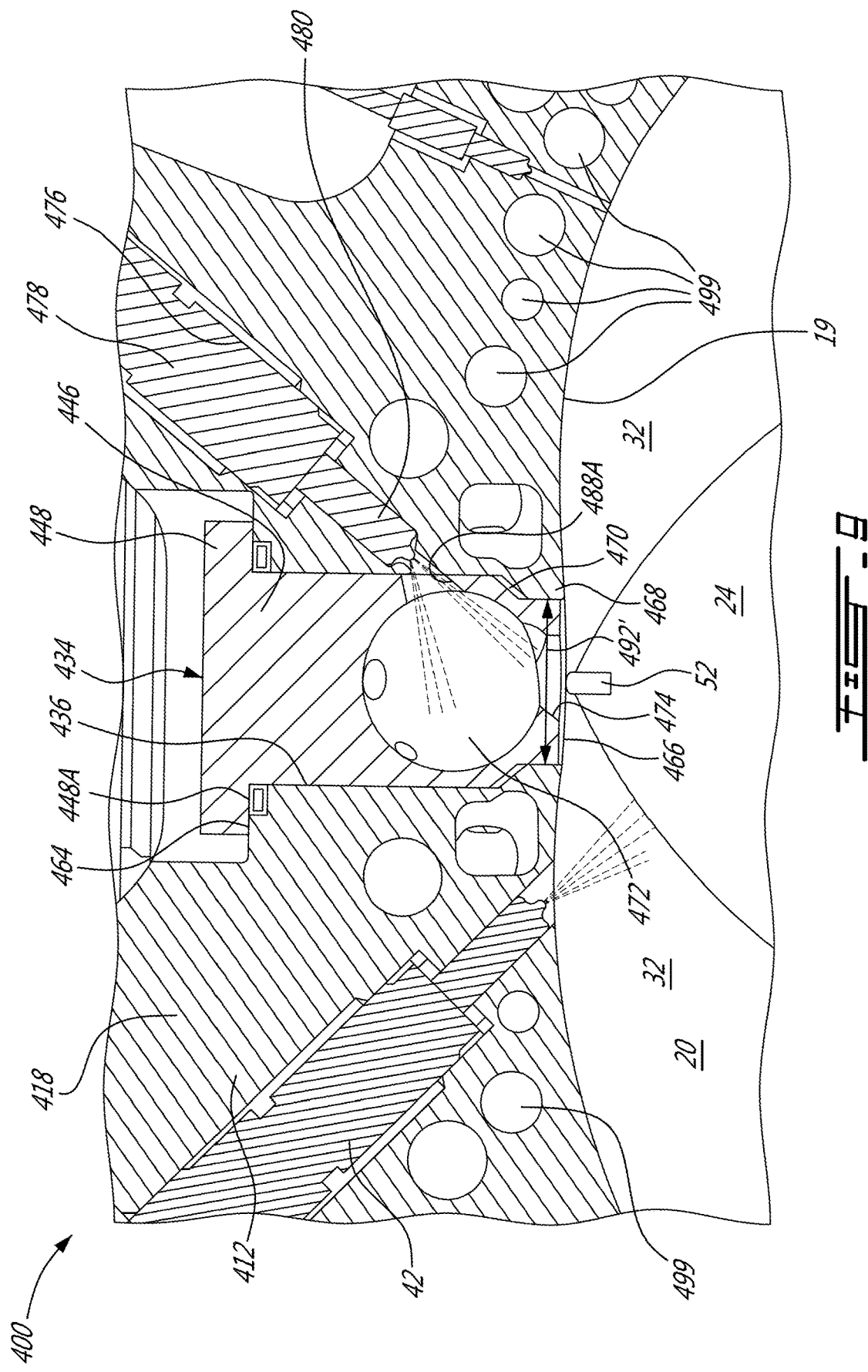

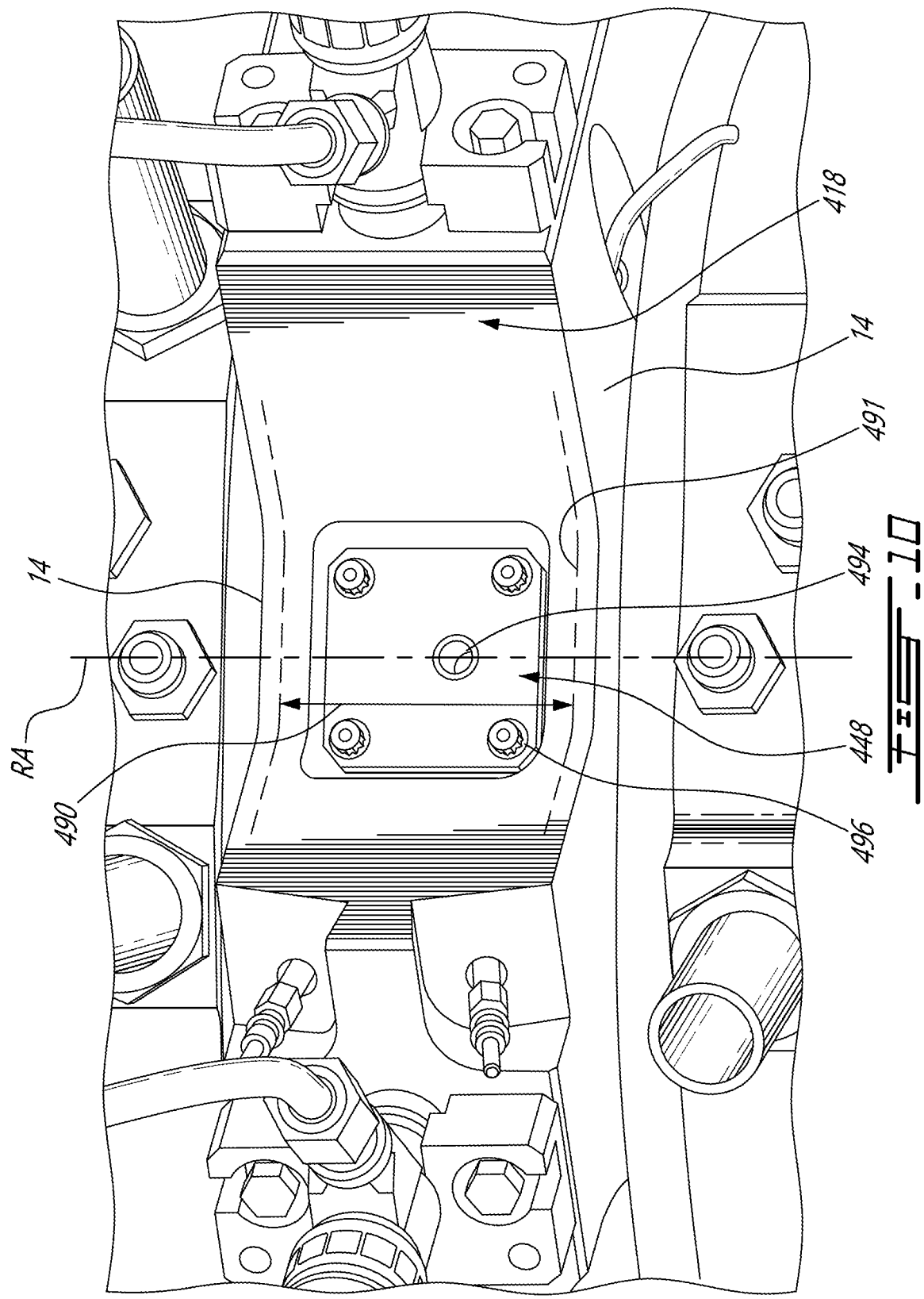

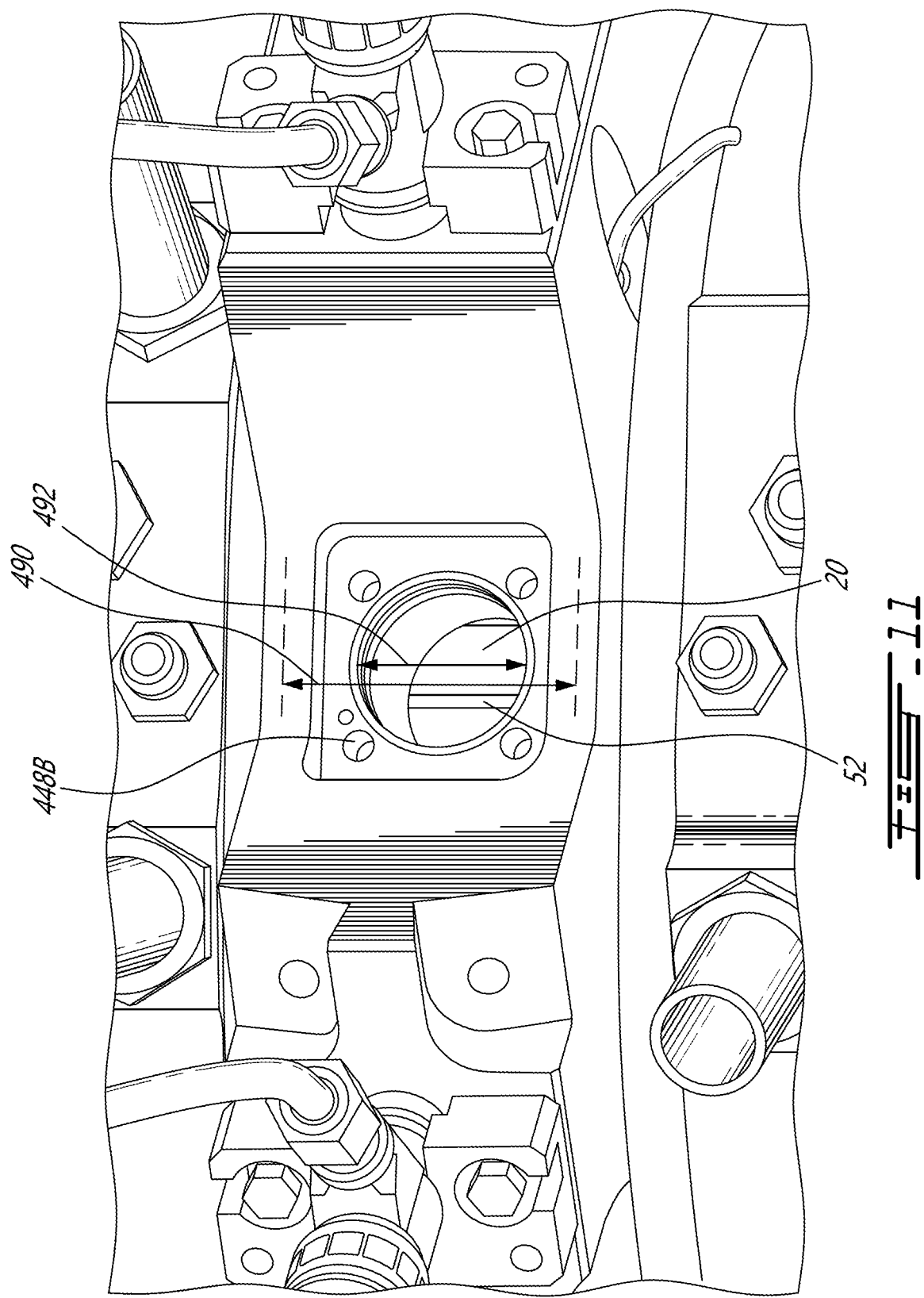

US 10,544,732 B2

ROTARY INTERNAL COMBUSTION ENGINE WITH REMOVABLE SUBCHAMBER INSERT

CROSS-REFERENCE TO RELATED APPLICATIONS

This application is a continuation-in-part of U.S. application Ser. No. 13/750,523 filed Jan. 25, 2013, which is a continuation-in-part of U.S. application Ser. No. 13/273,534 filed Oct. 14, 2011, which claims priority on provisional U.S. application No. 61/512,593 filed Jul. 28, 2011, the entire contents of all of which are incorporated by reference herein.

TECHNICAL FIELD

The application relates generally to a rotary internal combustion engine.

BACKGROUND OF THE ART

Rotary engines, such as for example Wankel engines, use the rotation of a piston to convert pressure into a rotating motion, instead of using reciprocating pistons. In these engines, the rotor typically includes a number of seals that remain in contact with a peripheral wall of the internal cavity of the engine throughout the rotational motion of the rotor to create a plurality of rotating chambers when the rotor rotates.

Rotary engines come in many forms. One well-known type, the Wankel engine, has a generally triangular rotor received in a two-lobed epitrochoid cavity. Other non-Wankel rotary engines types exist as well.

Rotors and internal cavities of rotary engines may be difficult to inspect, often requiring substantial disassembly to be able to inspect the more critical regions where combustion occurs.

SUMMARY

In one aspect, there is provided a rotary engine comprising: an outer body having an internal cavity defined by two axially spaced apart end walls and a peripheral wall extending between the end walls, the peripheral wall having an insert opening defined therethrough in communication with the internal cavity, and a plurality of coolant passages defined through the peripheral wall in proximity of the insert opening, the coolant passages forming part of a cooling circuitry for circulating a liquid coolant therethrough; a rotor body rotatable within the internal cavity in sealing engagement with the peripheral wall and defining at least one chamber of variable volume in the internal cavity around the rotor body; and an insert removably received in the insert opening of the peripheral wall, the insert having a subchamber defined therein communicating with the internal cavity; wherein a minimum width of the insert opening is defined along a direction of an axis of rotation of the rotor body, the minimum width of the insert opening being at least 0.75 inches.

In another aspect, there is provided an outer body for a rotary engine comprising: two axially spaced apart end walls; a peripheral wall extending between the end walls and defining an internal cavity for receiving a rotor, the peripheral wall having an insert opening defined therethrough in communication with the internal cavity, and a plurality of coolant passages defined through the peripheral wall in proximity of the insert opening, the coolant passages forming part of a cooling circuitry for circulating a liquid coolant therethrough; an insert removably received in the insert opening of the peripheral wall, the insert having a subchamber defined therein communicating with the internal cavity; a fuel injector in fluid communication with the subchamber; and an ignition element in heat transfer communication with the subchamber; wherein a minimum width of a cross-section of the insert opening is at least 0.75 inches.

In another aspect, there is provided a method of inspecting an internal cavity in an outer body of a rotary engine, the method comprising: detaching an insert from the outer body, the insert received in an insert opening of a peripheral wall of the outer body and including a subchamber configured for receiving fuel for ignition; removing the insert from the insert opening; and performing an unaided visual inspection of the internal cavity through the insert opening to determine if a subsequent maintenance or repair operation is required.

In another aspect, there is provided a method of performing maintenance on a rotary engine, including inspecting the internal cavity of the rotary engine following the method described above, disassembling at least part of the rotary engine upon determination that a subsequent maintenance or repair operation is required, and then performing the subsequent maintenance or repair operation on the rotary engine.

In a further aspect, there is provided a rotary engine comprising: an outer body having an internal cavity defined by two axially spaced apart end walls and a peripheral wall extending between the end walls, the peripheral wall having an insert opening defined therethrough in communication with the internal cavity, and an injector hole defined therein in communication with the insert opening; a rotor body rotatable within the internal cavity in sealing engagement with the peripheral wall and defining at least one chamber of variable volume in the internal cavity around the rotor body; an insert removably received in the insert opening of the peripheral wall, the insert having a subchamber defined therein communicating with the internal cavity and with the injector hole; and a fuel injector having a tip received in the injector hole of the peripheral wall without protruding in the insert opening.

DESCRIPTION OF THE DRAWINGS

Reference is now made to the accompanying figures in which:

FIG. 1 is a partial, schematic cross-sectional view of a rotary internal combustion engine in accordance with a particular embodiment;

FIG. 2 is a schematic cross-sectional view of an insert of the engine of FIG. 1;

FIG. 3 is a schematic cross-sectional view of an insert in accordance with another embodiment;

FIG. 4 is a schematic cross-sectional view of an insert in accordance with a further embodiment;

FIG. 5 is a schematic cross-sectional view of a rotary internal combustion engine in accordance with another embodiment;

FIG. 6 is a schematic cross-sectional view of a rotary internal combustion engine in accordance with another embodiment;

FIG. 7 is a schematic cross-sectional view of a rotary internal combustion engine in accordance with another embodiment;

FIG. 9 is a partial, schematic cross-sectional view of a rotary internal combustion engine including an insert in accordance with a further embodiment;

FIG. 10 is a partial, schematic top view of the rotary engine and insert of FIG. 9;

FIG. 11 is a partial, schematic top view of the rotary engine of FIG. 9 with the insert removed, showing part of a rotor of the rotary engine through the insert opening;

FIG. 12 is a partial, schematic cross-sectional view of a rotary internal combustion engine in accordance with another embodiment.

DETAILED DESCRIPTION

Figure 8:
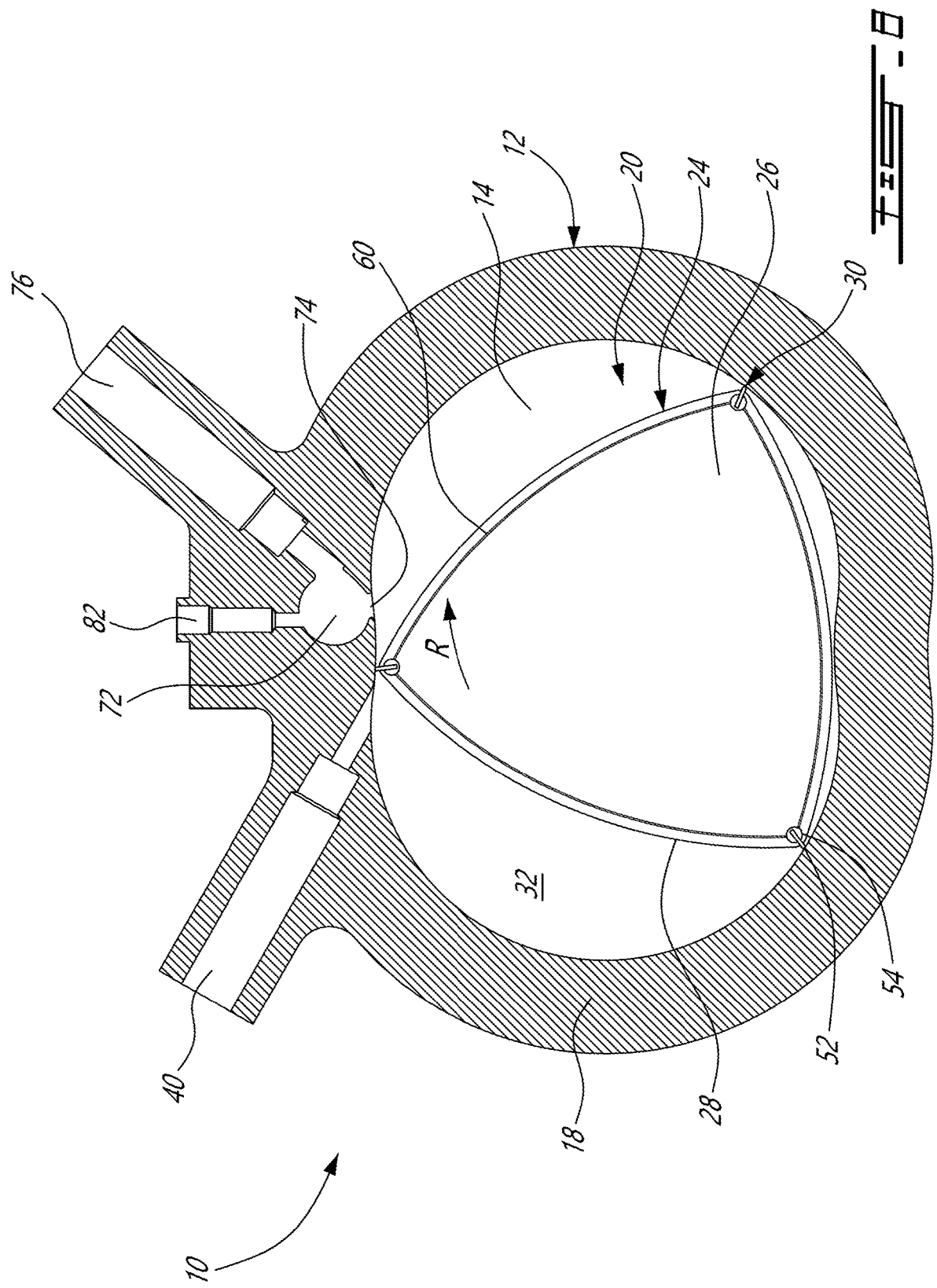
FIG. 8 is a schematic cross-sectional view of a rotary internal combustion engine in accordance with another embodiment.
Figure 17:
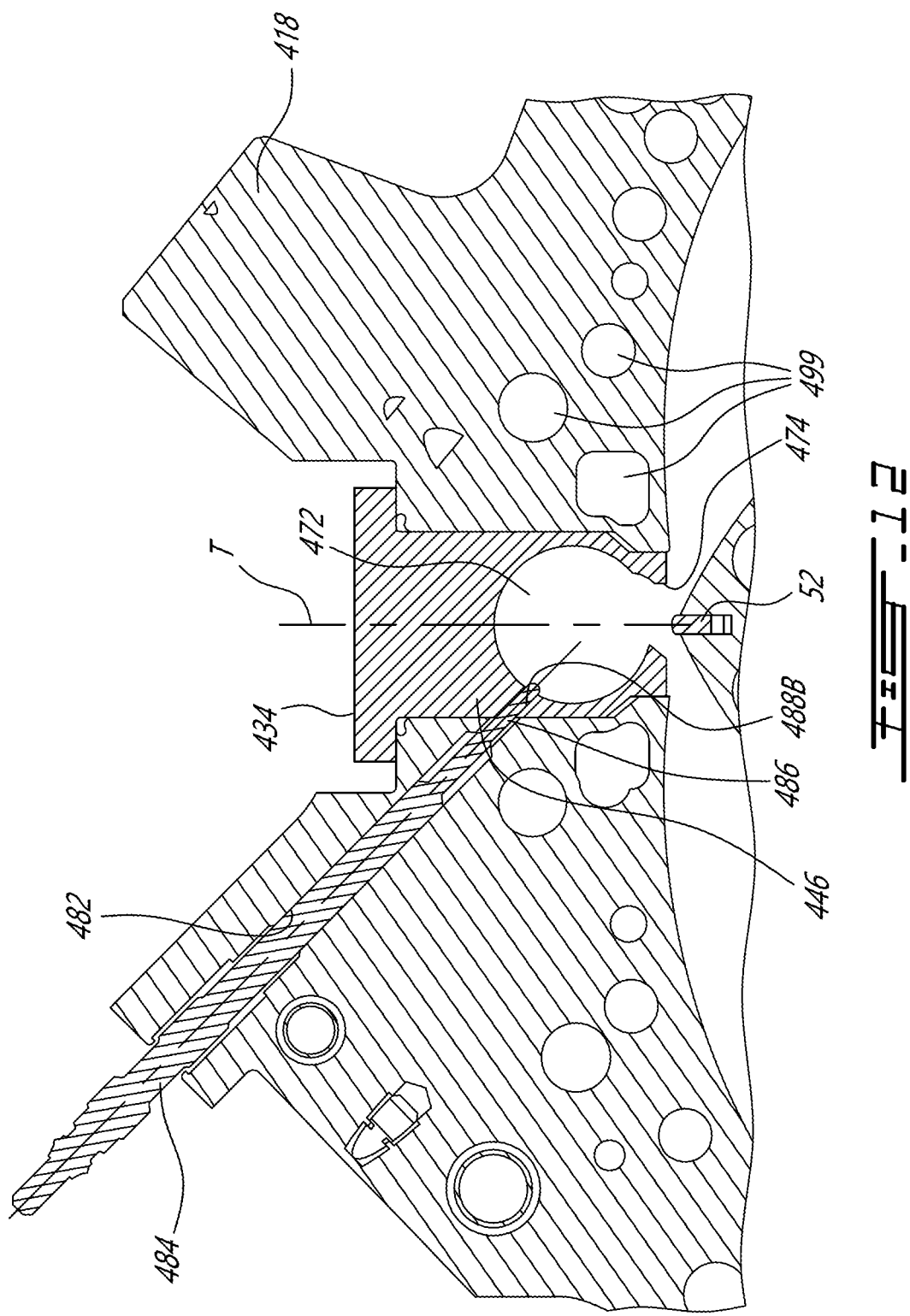

Referring to FIG. 1, a rotary internal combustion engine 10 known as a Wankel engine is schematically and partially shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used without a turbocharger, with air at atmospheric pressure.

The engine 10 comprises an outer body 12 having axially-spaced end walls 14 with a peripheral wall 18 extending therebetween to form an internal cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 (only one of which is shown), and a generally triangular profile with outwardly arched sides. The apex portions 30 are in sealing engagement with the inner surface of peripheral wall 18 to form three rotating working chambers 32 (only two of which are partially shown) between the inner rotor 24 and outer body 12. A recess 38 is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the internal cavity 20. The shaft rotates three times for each complete rotation of the rotor 24 as it moves around the internal cavity 20. Oil seals are provided around the phasing gear to prevent leakage flow of lubricating oil radially outwardly thereof between the respective rotor end face 26 and outer body end wall 14.

At least one inlet port (not shown) is defined through one of the end walls 14 or the peripheral wall 18 for admitting air (atmospheric or compressed) into one of the working chambers 32, and at least one exhaust port (not shown) is defined through one of the end walls 14 or the peripheral wall 18 for discharge of the exhaust gases from the working chambers 32. The inlet and exhaust ports are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

As described further below, a subchamber, which in the particular embodiment shown is a pilot subchamber 72, is defined in the outer body 12, for pilot fuel injection and ignition. In this example, the subchamber 72 is provided in an insert 34 received in a corresponding insert opening 36 defined through the peripheral wall 18 of the outer body 12 and in communication with the internal cavity 20, for pilot fuel injection and ignition. The peripheral wall 18 also has a main injector elongated hole 40 defined therethrough, in communication with the internal cavity 20 and spaced apart from the insert 34. A main fuel injector 42 is received and retained within this corresponding hole 40, with the tip 44 of the main injector 42 communicating with the cavity 20 at a point spaced apart from the insert 34. The main injector 42 is located rearwardly of the insert 34 with respect to the direction R of the rotor rotation and revolution, and is angled to direct fuel forwardly into each of the rotating chambers 32 sequentially with a tip hole pattern designed for an adequate spray.

Referring particularly to FIG. 2, in this example the insert includes an elongated body 46 extending across a thickness of the peripheral wall 18, with an enlarged flange 48 at its outer end which is biased away from a shoulder 50 defined in the peripheral wall 18, and against a gasket (not shown) made of an appropriate type of heat resistant material such as a silica based material. A washer 56, such as for example a steel or titanium washer, and spring 58, such as for example a wave spring or a Belleville spring, are provided between the flange 48 and the shoulder 50 of the peripheral wall 18. The spring 58 biases the body 46 against a cover 62 having a cross-section greater than that of the insert opening 36 and extending over an outer surface 64 of the peripheral wall 18. The cover 62 is connected to the peripheral wall 18, for example through brazing. Alternate types of connections can also be used, including but not limited to a connection through fasteners such as bolts, to help facilitate replacement of the insert if necessary.

The insert body 46 has an inner surface 66 which is continuous with the inner surface 19 of the peripheral wall 18 to define the cavity 20. The insert opening 36 in the wall 18 defines a flange 68 extending in the insert opening 36 adjacent the inner surface 19, and the inner end of the insert body 46 is complementarily shaped to engage this flange 68, with a gasket 70 being received therebetween.

In this example, the insert body 46 is made of a material having a greater heat resistance than that of the peripheral wall 18, which in a particular embodiment is made of aluminium. In this particular embodiment, the insert body 46 is made of an appropriate type of ceramic.

The insert body 46 has a pilot subchamber 72 defined therein in communication with the internal cavity 20. In the embodiment shown, the subchamber 72 has a circular cross-section; alternate shapes are also possible. The subchamber 72 communicates with the cavity through at least one opening 74 defined in the inner surface 66. The subchamber 72 has a shape forming a reduced cross-section adjacent the opening 74, such that the opening 74 defines a restriction to the flow between the subchamber 72 and the cavity 20. The opening 74 may have various shapes and/or be defined by a pattern of multiple holes. As can be seen in FIG. 2, the opening 74 has an area smaller than the maximum cross-sectional area of the subchamber 72, which is defined spaced apart from the opening 74.

The peripheral wall 18 has a pilot injector elongated hole 76 defined therethrough in proximity of the insert 34, extending at a non-zero angle with respect to a surface of an outer wall of the insert 34 and with respect to the longitudinal direction of the insert (which in the embodiment shown corresponds to the direction of the transverse axis T of the outer body 12). The pilot injector hole 76 is in communication with the subchamber 72. A pilot fuel injector 78 is received and retained within the corresponding hole 76, with the tip 80 of the pilot injector 78 being received in the subchamber 72. As can be seen in FIG. 2, the insert body 46 has an injector opening defined therethrough providing the communication between the pilot injector elongated hole 76 and the subchamber 72, and the tip 80 of the pilot injector 78 is received in the subchamber 72 through this injector opening, with a major part of the pilot injector 78 being received in the pilot injector elongated hole 76 outside of the insert 34. The opening providing the communication between the pilot injector elongated hole 76 and the subchamber 72 has an area smaller than the maximum cross-sectional area of the subchamber 72.

The insert body 46 and cover 62 have an ignition element elongated hole 82 defined therein extending along the direction of the transverse axis T of the outer body 12, also in communication with the subchamber 72. As can be seen in FIG. 2, the ignition element elongated hole 82 and the subchamber 72 communicate through an opening having an area smaller than the maximum cross-sectional area of the subchamber 72. An ignition element 84 is received and retained within the corresponding hole 82, with the tip 86 of the ignition element 84 being received in the subchamber 72. In the embodiment shown, the ignition element 84 is a glow plug. Alternate types of ignition elements 84 which may be used include, but are not limited to, plasma ignition, laser ignition, spark plug, microwave, etc.

The pilot injector 78 and main injector 42 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

Referring to FIG. 3, an insert 134 according to another embodiment is shown, engaged to the same outer body 12. The insert 134 extends across a thickness of the peripheral wall 18, and includes an inner body portion 146 and an outer body portion 162 which are attached together, for example through a high temperature braze joint 188. The outer body portion 162 has an enlarged flange 148 at its outer end which abuts the outer surface 64 of the peripheral wall 18 and is connected thereto, for example through bolts with appropriate sealing such as a gasket or crush seal (not shown). Alternate types of connections can also be used, including but not limited to a brazed connection.

The inner body portion 146 has an inner surface 166 which is continuous with the inner surface 19 of the peripheral wall 18 to define the cavity 20. The inner end of the inner body portion 146 is complementarily shaped to engage the flange 68 extending in the insert opening 36 adjacent the inner surface 19, with a gasket 70 being received therebetween.

In this particular embodiment, the body portions 146, 162 are made of an appropriate type of super alloy such as a Nickel based super alloy.

The subchamber configured as a pilot subchamber 72 is defined in the insert 134 at the junction between the body portions 146, 162, with the inner body portion 146 defining the opening 74 for communication between the subchamber 72 and the cavity 20. The outer body portion 162 has the ignition element elongated hole 82 defined therein along the direction of the transverse axis T and in communication with the subchamber 72. The ignition element 84 is received and retained within the corresponding hole 82, for example through threaded engagement. As in the previous embodiment, the tip 86 of the ignition element 84 is received in the subchamber 72.

Referring to FIG. 4, an insert 234 according to another embodiment is shown. The insert 234 is received in a corresponding insert opening 236 defined through the peripheral wall 18. The insert 234 includes an inner body portion 246 and an outer body portion 262 which are attached together, for example through a high temperature braze joint, with the subchamber 72 being defined at the junction of the two portions 246, 262. The inner body portion 246 defines the opening 74 for communication between the subchamber 72 and the cavity 20.

The outer body portion 262 has the ignition element elongated hole 82 defined therethrough in communication with the subchamber 72. The outer body portion 262 includes an inner enlarged section 245 connected to the inner body portion 246 and defining the subchamber 72. The enlarged section 245 extends substantially across the width of the insert opening 236 around the subchamber 72, then tapers to a reduced width section 247 extending therefrom.

The reduced width section 247 has at its outer end an enlarged flange 248 which abuts a shoulder 250 defined in the outer surface 64 of the peripheral wall 18 around the insert opening 236. An outer section 249, which in the embodiment shown has a width intermediate that of the sections 245 and 247, extends outwardly from the flange 248. The flange is connected to the shoulder, for example through bolts (not shown) with appropriate sealing such as a crush seal or a gasket (not shown) made of high temperature material, for example a silica based material or grafoil, between the flange 248 and shoulder 250. Alternate types of connections can also be used.

The inner body portion 246 has an inner surface 266 which is continuous with the inner surface 19 of the peripheral wall 18 to define the cavity 20. The inner body portion 246 includes a groove defined therearound near the inner surface 266, in which an appropriate seal 251, for example a silica based gasket tape, is received in contact with the walls of the insert opening 236. In this embodiment, the walls of the insert openings 236 are straight adjacent the inner surface 19, i.e. there is no flange adjacent the inner surface 19.

The volume of the pilot subchamber 72 in the insert 34, 134, 234 is selected to obtain a stoichiometric mixture around ignition within an acceptable delay, with some of the exhaust product from the previous combustion cycle remaining in the subchamber 72. In a particular embodiment, the volume of the subchamber 72 is at least 0.5% and up to 3.5% of the displacement volume, with the displacement volume being defined as the difference between the maximum and minimum volumes of one chamber 32. In another particular embodiment, the volume of the subchamber 72 corresponds to from about 0.625% to about 1.25% of the displacement volume.

The volume of the pilot subchamber 72 may also be defined as a portion of the combustion volume, which is the sum of the minimum chamber volume Vmin (including the recess 38) and the volume of the subchamber V2 itself. In a particular embodiment the subchamber 72 has a volume corresponding to from 5% to 25% of the combustion volume, i.e. V2=5% to 25% of (V2+Vmin). In another particular embodiment, the subchamber 72 has a volume corresponding to from 10% to 12% of the combustion volume, i.e. V2=10% to 12% of (V2+Vmin).

The subchamber 72 may help create a stable and powerful ignition zone to ignite the overall lean main combustion chamber 32 to create the stratified charge combustion. The subchamber 72 may improve combustion stability, particularly but not exclusively for a rotary engine which operates with heavy fuel below the self-ignition of fuel. The insert 34, 134, 234 made of a heat resistant material may advantageously create a hot wall around the subchamber which may further help with ignition stability.

The teachings herein are applicable to many rotary engine types, and not just Wankel engines. Therefore, in another embodiment, the rotary engine with subchamber the 72 may be a non-Wankel engine. A "non-Wankel" engine, as used in this description and the appended claims, means a rotary engine suitable for use with the present invention, but excluding Wankel type engines.

In a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein.

Referring to FIG. 5, an example of a sliding vane engine 100 is shown. The engine 100 includes an outer body 112 defining an internal cavity 20 receiving a rotor 124 having a number of vanes 125. The rotor 124 includes an inner hub assembly 127 rotating about a first axis and an outer hub assembly 129 rotating about a second axis offset from the first axis, with the two hub assemblies 127, 129 being mechanically linked. The vanes 125 are pivotally connected to the inner hub assembly 127 and are slidingly engaged through slots defined between adjacent sections of the outer hub assembly 129. The sections of the outer hub assembly 129 are thus sealingly engaged to the vanes 125 at different distances from the first axis of the inner hub assembly 127, defining a plurality of chambers 32 of variable volume within the cavity 20 around the rotor 124.

In the embodiment shown, the engine 100 includes the subchamber 72 described above, in this example defined in the insert 34 received in an insert opening 36 of a peripheral wall 118 of the outer body 112. The peripheral wall 118 also has a main injector elongated hole 40 defined therethrough, in communication with the internal cavity 20 and spaced apart from the insert 34. The insert is biased against the cover 62 retaining the insert 34 within the insert opening 36. The insert 34 is made of a material having a greater heat resistance than that of the peripheral wall 118 and defines the pilot subchamber 72 in communication with the internal cavity 20 through at least one opening 74. The peripheral wall 118 and/or the insert 34 has the pilot injector elongated hole 76 and the ignition element elongated hole 82 defined therethrough in communication with the subchamber 72. Other embodiments may be provided for the insert in the engine 100, including, but not limited to, the other inserts 134, 234 described above.

In another particular embodiment, the rotary engine may be an oscillatory rotating engine, including two or more rotors rotating at different angular velocities, causing the distance between portions of the rotors to vary and as such the chamber volume to change. Referring to FIG. 6, an example of such an engine is shown. The engine 200 includes an inner rotor 224 and an outer body or rotor 212 rotating at different angular velocities, the outer rotor 212 defining an internal cavity 20 in which the inner rotor 212 is received. Chambers 32 of variable volume are defined within the cavity 20 around the inner rotor 224.

In the embodiment shown, the engine 200 includes the subchamber 72 described above, in this example defined in the insert 34 received in an insert opening 36 of a peripheral wall 218 of the outer body 212. The peripheral wall 218 also has the main injector elongated hole 40 defined therethrough spaced apart from the insert 34, and the peripheral wall 218 and/or the insert 34 has the pilot injector elongated hole 76 and the ignition element elongated hole 82 defined therethrough. Other embodiments may be provided for the insert in the engine 200, including, but not limited to, the other inserts 134, 234 described above.

In another particular embodiment, the rotary engine is a planetary rotating engine having a different geometry than that of the Wankel engine. Referring to FIG. 7, an example of such an engine is shown. The engine 300 includes an outer body 312 forming an internal cavity 20 with a peripheral inner surface thereof having an epitrochoid profile defining three lobes. The engine 300 also includes a rotor 324 with four apex portions 330 in sealing engagement with the peripheral inner surface to form four rotating working chambers 32 of variable volume within the cavity 20 around the rotor 324. The rotor 324 is journaled on an eccentric portion of a shaft and performs orbital revolutions within the cavity 20.

In the embodiment shown, the engine 300 includes the subchamber 72 described above, in this example defined in the insert 34 received in an insert opening 36 of a peripheral wall 318 of the outer body 312. The peripheral wall 318 also has the main injector elongated hole 40 defined therethrough spaced apart from the insert 34, and the peripheral wall 318 and/or the insert 34 has the pilot injector elongated hole 76 and the ignition element elongated hole 82 defined therethrough. Other embodiments may be provided for the insert in the engine 300, including, but not limited to, the other inserts 134, 234 described above.

The subchamber 72 may be provided integrally within the outer body 12, 112, 212, 312 of the engine 10, 100, 200, 300, provided the outer body 12, 112, 212, 312 is made of a material having adequate heat resistance and such other properties required to provide a suitable outer body. Referring to FIG. 8, the Wankel engine 10 is shown with the subchamber 72, pilot injector hole 76 and ignition element hole 82 integrally defined in the outer body 12, more particularly in the peripheral wall 18. In a particular embodiment, the outer body 12 is made of a material having a heat resistance greater than that of aluminium. In a particular embodiment, the outer body 12 is made of an appropriate type of ceramic or of an appropriate type of super alloy, such as for example a Nickel based super alloy. Though not shown, a wear insert may be provided in the internal cavity 20 for contacting the rotor sliding surfaces. The integral subchamber may be applied to any of the rotary engine configurations contemplated by the present description.

Referring to FIG. 9, a rotary engine 400 and an insert 434 according to another embodiment is shown. Although the engine 400 is depicted as a Wankel engine, with an outer body including a peripheral wall 418 extending between two axially spaced apart end walls 14 to define an internal cavity 20 receiving a rotor 24, it is understood that the engine 400 may alternately be any other adequate type of rotary engine, including, but not limited to, the rotary engines described above.

The insert 434 is removably received in an insert opening 436 extending across a thickness of the peripheral wall 418 of the outer body of the engine 400. The insert 434 includes an elongated insert body 446, with an enlarged flange 448 at its outer end which abuts shoulders 464 defined by the insert opening 436 having an enlarged cross-section adjacent its communication with the outer surface of the peripheral wall 418. Alternately, the flange 448 can abut the outer surface of the peripheral wall 418. A seal 448A is disposed between the flange 448 and the shoulders 464 to seal the insert opening 436. The seal 448A can be a C-seal or any other suitable seal. The insert opening 436 is located at or near top dead center, downstream of the main fuel injector 42 communicating with the internal cavity 20 of the engine 400 and upstream of a maximum temperature and pressure region of the internal cavity 20. The maximum pressure and temperature region is defined as a region of the chambers 32 just after top dead center. The fuel in the internal cavity 20 is ignited before top dead center (BTDC) and releases its energy such that maximum compression of the gas mixture is obtained just after top dead center (ATDC) (i.e. just after the minimum volume for the chambers 32). In a particular embodiment, the maximum pressure obtained in this region is in the order of 1500 psi.

The insert body 446 has an inner surface 466 which is continuous with an inner surface 19 of the peripheral wall 418 defining the internal cavity 20. The insert opening 436 has a reduced cross-section adjacent the inner surface 19, the reduced cross-section being defined by a flange 468 of the peripheral wall 418 surrounding and protruding into the insert opening 436 adjacent the inner surface 19. The inner end of the insert body 446 is complementarily shaped to engage this flange 468; optionally, a gasket may be received between the insert body 446 and flange 468, for example at 470. In the embodiment shown, the outer surface of the flange 468 abutting the insert body 446 is frusto-conical such that a thickness of the flange 468 is progressively reduced toward a central axis of the insert opening 436; other configurations are also possible.

The insert body 446 has a subchamber configured as a pilot subchamber 472 defined therein in communication with the internal cavity 20. In the embodiment shown, the subchamber 472 has a circular cross-section; alternate shapes are also possible. The subchamber 472 communicates with the cavity 20 through at least one opening 474 defined in the inner surface 466.

In this embodiment, the peripheral wall 418 has a pilot injector elongated hole 476 defined therethrough in proximity of the insert 434 and communicating with the insert opening 436. The pilot injector elongated hole 476 has a shape similar to the pilot injector elongated hole 76 described above. The pilot injector hole 476 is in communication with the subchamber 472 through an injector opening 488A defined in the insert body 446, and which has an area smaller than the maximum cross-sectional area of the subchamber 472. A pilot fuel injector 478 is received and retained within the corresponding hole 476. However, in this embodiment, the pilot fuel injector 478 extends with its tip 480 received in the pilot injector hole 476 without any part of the pilot fuel injector 478 protruding in the insert opening 436; the injector opening 488A is thus free of the pilot fuel injector 478. The pilot fuel injector 478 is clear from the subchamber 472 and the insert opening 436 to allow removal of the insert 434 without the need to removing the pilot fuel injector 478.

Referring to FIGS. 10 and 11, a threaded hole 494 is provided (e.g. centrally disposed) in the flange 448 of the insert 434, configured to receive and having a shape complementary to that of a threaded tool. Upon engagement with the threaded hole 494, the threaded tool may facilitate removal of the insert 434 from the insert opening 436 when required, for example for inspection or maintenance.

In the embodiment shown, the insert 434 is removably retained in the insert opening 436 by four threaded fasteners such as bolts 496 (FIG. 10) engaging the flange 448 of the insert 434 and the peripheral wall 418 through corresponding threaded holes 448B (FIG. 11) to secure the insert 434 with respect to the peripheral wall 418. It is understood that other types of fasteners allowing for the insert to be removably retained (e.g. retained such as to be removable without requiring to break, cut or damage the insert, wall or fastening mechanism) and/or different numbers of fasteners can also be used (e.g. one or more).

Referring to FIG. 12, the peripheral wall 418 has at least one ignition element elongated hole 482 defined therein, angled with respect to the transverse axis T of the outer body 12 and in communication with the subchamber 472 and the insert opening 436. The ignition element elongated hole 482 and the subchamber 472 communicate through an opening 488B in the insert body 446 aligned with the hole 182 and having an area smaller than the maximum cross-sectional area of the subchamber 472. An ignition element 484 is received and retained within the corresponding ignition element elongated hole 482 in heat transfer communication with the subchamber 472. In the embodiment shown, a tip 486 of the ignition element 484 is received in the subchamber 472. Alternately, the tip 486 of the ignition element 484 can be outside of the subchamber 472, opening 488B and/or insert opening 436 (for example, so that no part of the ignition element 484 penetrates the insert opening 436), and the heat transfer communication may be performed with or without a fluid communication between the ignition element elongated hole 482 and the subchamber 472 (for example, the opening 488B may be omitted).

Figure 13:
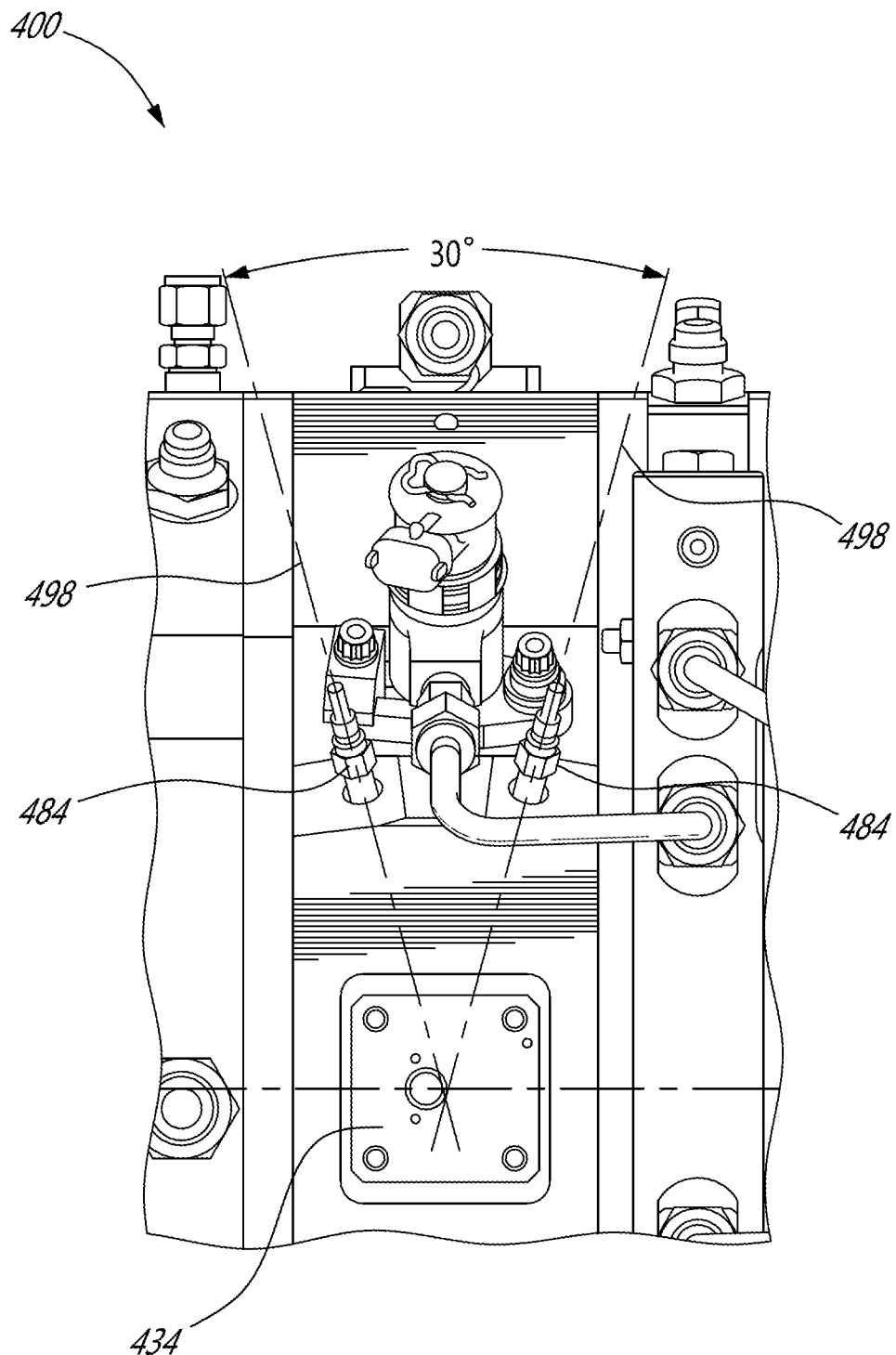
FIG. 13 is a partial, schematic top view of the engine of FIG. 12.

Referring to FIG. 13, in a particular embodiment, two ignition elements 484 are provided in communication with the subchamber 472. The ignition elements 484 are provided in different planes, so that each ignition element 484 is extending along a respective axis 498, the axes 498 intersecting. In a particular embodiment, the axes are disposed at a 30 degrees angle from each other. Alternately, the number and/or orientation of the ignition elements 484 can differ.

As can be seen in FIGS. 9 and 12, a plurality of coolant passages 499 are defined throughout the peripheral wall 418 (and although not shown, similar coolant passages may extend through the peripheral walls 18, 118, 218, 318 described above), including, but not limited to, in proximity of the insert 434. The coolant passages 499 are in fluid communication with one another by being part of a cooling circuitry through which a liquid coolant (e.g. water) circulates in a closed loop with a heat exchanger or any other element suitable to cool the used coolant for recirculation to the engine. The size and number of the coolant passages 499 are selected such as to be able to maintain the peripheral wall 418 at temperatures below the applicable maximum threshold for the material of the peripheral wall 418.

In the embodiment shown in FIGS. 12-13, the ignition elements 484 extend within the peripheral wall 418 along most of their length, which may facilitate cooling of the ignition elements 484 using the cooling circuitry provided in the outer body through the peripheral wall 418.

In a particular embodiment, the presence of coolant passages 499 can impede inspection, for example preventing the provision of a dedicated inspection port, particularly for the hotter regions where more cooling is required and where the presence of such a port could disturb the cooling pattern. In a particular embodiment, the presence of the insert 34, 134, 234, 434 allows for the insert opening 36, 236, 436 to be used as an inspection port, taking advantage of this existing opening to perform visual inspection of the internal cavity 20 through a region of the peripheral wall which includes the cooling passages 499. Since the insert 34, 134, 234, 434 is located adjacent the fuel injectors which are typically readily accessible in use for maintenance purposes, in a particular embodiment the insert 34, 134, 234, 434 is also readily accessible in use to be removed from the engine without the need to move the engine. Prior methods of rotary engine inspection include inspection through the inlet or outlet ports; the insert opening 36, 236, 436 is closer to the high pressure and temperature region of the engine than the ports, and accordingly in a particular embodiment provides for a better access to the portions of the internal cavity 20 which are most susceptible to damage. Prior methods of rotary engine inspection also include inspection through the hole left by removal of the ignition element; however, such inspection requires the use of inspection tools, for example a boroscope, since the hole is too small to be usable for visual and/or manual inspection. In a particular embodiment, the insert opening 36, 236, 436 is advantageously sized to allow for visual and/or manual inspection.

In a particular embodiment, inspection in the internal cavity 20 (i.e. of features of the outer body inside the internal cavity 20 and/or of the rotor 24 received therein) is performed in accordance with the following. If the ignition element(s) 484 extend(s) within the peripheral wall 418 and protrude(s) into the insert opening 436, the ignition element (s) 484 is/are disengaged from the insert 434. In an embodiment where the ignition element(s) is/are not engaged in the insert 434, or where the ignition element(s) 84, is/are received in the insert 34, 134, 234 without extending through the peripheral wall such as to be removable together with the insert 34, 134, 234 in a same step, this step may accordingly be omitted.

Similarly, if a fuel injector extends within the peripheral wall and protrudes into the insert opening, the fuel injector is disengaged from the insert. In an embodiment where the fuel injector is not engaged in the insert, received in the insert without extending through the peripheral wall such as to be removable together with the insert in a same step, this step may accordingly be omitted.

The insert 34, 134, 234, 434 is then removed from the insert opening 36, 236, 436 of the outer body, thereby providing access to the internal cavity 20 through the insert opening 36, 236, 436. To facilitate removal of the insert by a user, a threaded tool may be inserted into the threaded hole 494 provided in the insert 434 (a similar threaded hole may be provided in any of the inserts described herein) and a force is then applied on the threaded tool, for example a pulling force.

Once the insert 34, 134, 234, 434 is removed, the internal cavity 20 is inspected through the insert opening 36, 236, 436. The inspection can be done visually and/or manually. The inspection can include, but is not limited to, any one or any combination of inspecting the condition of the apex seals 52, inspecting the condition and/or operation of the spring(s) biasing the apex seals 52, inspecting the condition of a coating applied to the inner surface 19 of the peripheral wall 18, 118, 218, 318, 418 and/or to the inner surface 491 of the end walls 14, inspecting the condition of the rotor 24 itself (e.g. presence of cracks), verifying if liquid coolant and/or oil is present in the chambers 32, inspecting the fuel injector (e.g. its tip), particularly for the fuel injector communicating with the chamber but having a configuration allowing the insert to be removed without prior removal of the fuel injector, etc. Inspection of the condition of the coating can include inspection to detect one or more of pitting, erosion, delamination and cracks in the coating surface.

Following the results of inspection, appropriate maintenance and/or repair operations may be performed. Non-limiting examples of such operations include, with a prior step of disassembly of the engine in whole or in part when required:

When the condition of the apex seals 52 and/or of the spring(s) biasing the apex seals 52 is determined to be inadequate following the inspection, replacing damaged ones of the apex seals 52 and the springs;

When the condition of the coating applied to the inner surface 19 of the peripheral wall 18, 118, 218, 318, 418 and/or to the inner surface 491 of the end walls 14 is determined to be inadequate following the inspection, recoating the parts where the defects were detected, optionally stripping the existing coating before the recoating operation;

When the condition of the rotor 24 itself is determined to be inadequate following the inspection, performing required repairs to the rotor (e.g. weld repair or replacement) or replacing the rotor as a whole;

When the presence of liquid coolant in the chambers 32 is detected, replacing a broken or defective seal of the cooling (e.g. o-ring), and/or inspecting the outer body to find a crack responsible for the leak and repairing the crack or replacing the damaged part;

When the presence of oil in the chambers 32 is detected, replacing a broken or defective oil seal, or repair or replacement of the element responsible for the leak, with optional pressure testing to determine which element is responsible if the failure is not apparent;

When damage to the fuel injector (e.g. pilot fuel injector) is detected, replacing or repairing the fuel injector.

In a particular embodiment, a boroscope is optionally inserted through the insert opening 436, as a follow-up to a preliminary visual inspection, to further inspect the internal cavity 20. The use of the boroscope can advantageously provide a wider access to the internal cavity 20.

Referring back to FIGS. 10 and 11, the width 490 of the internal cavity is defined as the distance between the inner surfaces 491 of the end walls 14 along a direction parallel to a rotational axis RA of the rotor 24. In a particular embodiment and referring to FIG. 11, the width 492 of the insert opening 436, i.e. of its cross-section, defined perpendicularly to the thickness of the peripheral wall 418 (e.g. parallel to the rotational axis RA), is sufficiently large throughout the thickness of the peripheral wall 418 to be able to perform an unaided (i.e. without inspection instruments or tools) visual inspection of the internal cavity 20 through the insert opening 436; the minimal width is thus sized to correspond to, at least, a minimum dimension required for visual inspection, based on the size of the human eye.

In the embodiment of FIG. 9, the minimum width 492' of the insert opening 436 is a minimum diameter, since the insert opening 436 has a circular cross-section, and is located adjacent the inner surface 19 of the peripheral wall 418, i.e. at the radially innermost point of the insert opening 436. In a particular embodiment, the minimum width 492' is at least equal to ⅓ of the width 490 of the internal cavity 20. In a particular embodiment, the minimum width 492' of the insert opening 436 is between ⅓ and ½ of the width 490 of the internal cavity 20. For example, in a particular embodiment, the minimum width or diameter 492' of the insert opening 436 is at least 0.75 inch; in a particular embodiment, such a minimum width is sufficient to allow for visual inspection through the insert opening. In particular embodiments, the minimum width 492' of the insert opening 436 may correspond to any one of the following: at least 0.8 inch; at least 0.85 inch; at least 0.9 inch; at least 0.93 inch; about 0.93 inch; at least 1 inch. It is understood that the particular dimensions provided herein are also applicable to the insert openings 36, 236 of the other embodiments discussed.

The ability to perform visual inspection is highly desirable, and in a particular embodiment allows for reduction of the costs and/or time associated with preliminary inspections, as opposed to engine configurations which require instruments and/or disassembly of the housing to be inspected; a larger insert opening 36, 236, 436 provides better exposure of the internal cavity 20 for visual inspection.

It is understood that the removable insert 34, 134, 234, 434 allowing inspection of the internal cavity 20 through the insert opening 36, 236, 436 is not limited to an insert defining a pilot subchamber for pilot ignition. For example, in particular embodiments, the removable insert 34, 134, 234, 434 allowing inspection of the internal cavity 20 through the insert opening 36, 236, 436 is an insert defining other types of subchambers, such as for example a pre-chamber for combustion, where the whole volume of fuel is injected for ignition—i.e. where the main injector is in communication with the pre-chamber in the insert. Other configurations are also possible.

The above description is meant to be exemplary only, and one skilled in the art will recognize that changes may be made to the embodiments described without departing from the scope of the invention(s) disclosed. For example, the mechanical arrangements of the rotary engines described above are merely examples of many possible configurations which are suitable for use with the present invention(s). Any suitable injector configuration and arrangement may be used. Hence, modifications which fall within the scope of the present invention will be apparent to those skilled in the art, in light of a review of this disclosure, and such modifications are intended to fall within the appended claims.

The invention claimed is:

1. A method of performing maintenance of a rotary engine having an internal cavity, the method comprising:
    unfastening at least one fastener retaining an insert in an insert opening of a peripheral wall of an outer body of the engine;
    removing the insert from the insert opening to uncover an opening larger than a flow opening defined in the insert;
    performing a visual inspection within the internal cavity through the uncovered opening of at least one of a rotor and a stator; and
    performing a maintenance operation on the rotary engine based on an outcome of the visual inspection.

2. The method as defined in claim 1, wherein removing the insert includes applying a pulling force on the insert via a threaded tool inserted into a threaded hole defined in the insert.

3. The method as defined in claim 1, wherein removing the insert is performed without removing a fuel injector received in the peripheral wall and in communication with the subchamber.

4. The method as defined in claim 1, wherein a minimum width of a cross-section of the insert opening is at least 0.75 inches.

5. The method as defined in claim 1, wherein performing the visual inspection includes inspecting an apex seal of the rotor.

6. The method as defined in claim 1, wherein performing the visual inspection includes verifying a presence of cracks in the rotor.

7. The method as defined in claim 1, wherein performing the visual inspection includes verifying if liquid coolant or oil is present in at least one chamber defined in the internal cavity.

8. The method as defined in claim 1, wherein inner surfaces of the outer body have a coating applied thereon, and wherein performing the visual inspection includes inspecting the coating.

9. The method as defined in claim 1, wherein the insert is in fluid communication with a fuel injector and in heat transfer relationship with an ignition element, and removing the insert from the insert opening is performed without prior removal of at least one of the fuel injector and of the ignition element from the outer body of the engine.

10. A method of performing maintenance on a rotary engine, comprising disassembling at least part of the rotary engine prior to performing the maintenance operation of claim 1 on the rotary engine.

11. A method of performing maintenance of a rotary engine having an internal cavity, the method comprising:
- unfastening at least one fastener retaining an insert in an insert opening of a peripheral wall of an outer body of the engine, the insert including a subchamber configured for receiving fuel for ignition and having defined therein a flow opening through which the subchamber communicates with the internal cavity;
- removing the insert from the insert opening to uncover an opening into the internal cavity, wherein the uncovered opening is larger than the flow opening;
- performing a visual inspection within the internal cavity through the uncovered opening of one or more of a rotor and a stator of the rotary engine; and
- performing a maintenance operation on the rotary engine based on an outcome of the visual inspection.

* * * * *